US012631875B2

(12) United States Patent
Tanimoto et al.

(10) Patent No.: US 12,631,875 B2
(45) Date of Patent: May 19, 2026

(54) CONTROL APPARATUS, CONTROL METHOD, STORAGE MEDIUM, AND MOVABLE APPARATUS, WITH SETTING TRANSMITTANCE IN ACCORDANCE WITH DISPLAY REGION OF VIRTUAL IMAGE

(71) Applicant: CANON KABUSHIKI KAISHA, Tokyo (JP)

(72) Inventors: Fumihiko Tanimoto, Kanagawa (JP); Asami Takenaga, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 149 days.

(21) Appl. No.: 18/413,292

(22) Filed: Jan. 16, 2024

(65) Prior Publication Data

US 2024/0255756 A1 Aug. 1, 2024

(30) Foreign Application Priority Data

Jan. 26, 2023 (JP) ................................. 2023-010059

(51) Int. Cl.
| | |
|---|---|
| *G02B 27/01* | (2006.01) |
| *B60K 35/23* | (2024.01) |
| *B60K 35/28* | (2024.01) |
| *G09G 3/00* | (2006.01) |

(52) U.S. Cl.
CPC .......... *G02B 27/0101* (2013.01); *B60K 35/23* (2024.01); *B60K 35/28* (2024.01); *G09G 3/002* (2013.01); *B60K 2360/186* (2024.01); *G02B 27/0179* (2013.01); *G09G 2340/045* (2013.01); *G09G 2380/10* (2013.01)

(58) Field of Classification Search
None
See application file for complete search history.

(56) References Cited

U.S. PATENT DOCUMENTS

| | | | |
|---|---|---|---|
| 9,959,767 B1 * | 5/2018 | Canella | .................. B60K 35/28 |
| 2007/0067089 A1 * | 3/2007 | Yoshida | ............. G02B 27/0101 |
| | | | 701/96 |

(Continued)

FOREIGN PATENT DOCUMENTS

| | | |
|---|---|---|
| JP | 2020-033003 A | 3/2020 |

OTHER PUBLICATIONS

Jul. 1, 2024 European Official Action in European Patent Appln. No. 24153172.2.

*Primary Examiner* — Jason A Pringle-Parker
(74) *Attorney, Agent, or Firm* — Venable LLP

(57) ABSTRACT

To ensure both the visibility of a virtual image and the visibility of objects around a movable apparatus, a control apparatus mounted on the movable apparatus controls a display apparatus that displays a virtual image to an operator of the movable apparatus, comprising at least one processor or circuit configured to function as a display control unit for controlling the display apparatus to display content recorded in a recording unit, and a setting unit configured to set a display mode of the content, wherein the setting unit is configured to set transmittance such that, in a case in which the display region of the virtual image is equal to or greater than a predetermined area, the transmittance of the virtual image becomes larger than in a case in which the display region of the virtual image is less than the predetermined area.

11 Claims, 12 Drawing Sheets

(56) References Cited

U.S. PATENT DOCUMENTS

| | | | |
|---|---|---|---|
| 2010/0321170 A1* | 12/2010 | Cooper | G02B 27/01 |
| | | | 345/9 |
| 2015/0170422 A1* | 6/2015 | Aoyama | G06T 15/005 |
| | | | 345/8 |
| 2017/0162177 A1* | 6/2017 | Lebeck | G06F 21/6218 |
| 2017/0270899 A1* | 9/2017 | Sato | B60R 11/02 |
| 2018/0066956 A1* | 3/2018 | Kim | G01C 21/3682 |
| 2018/0198955 A1 | 7/2018 | Watanabe | |
| 2019/0279407 A1* | 9/2019 | McHugh | G06F 3/011 |
| 2021/0155159 A1 | 5/2021 | Kawate | |
| 2022/0107497 A1 | 4/2022 | Murata | |

* cited by examiner

FIG. 7

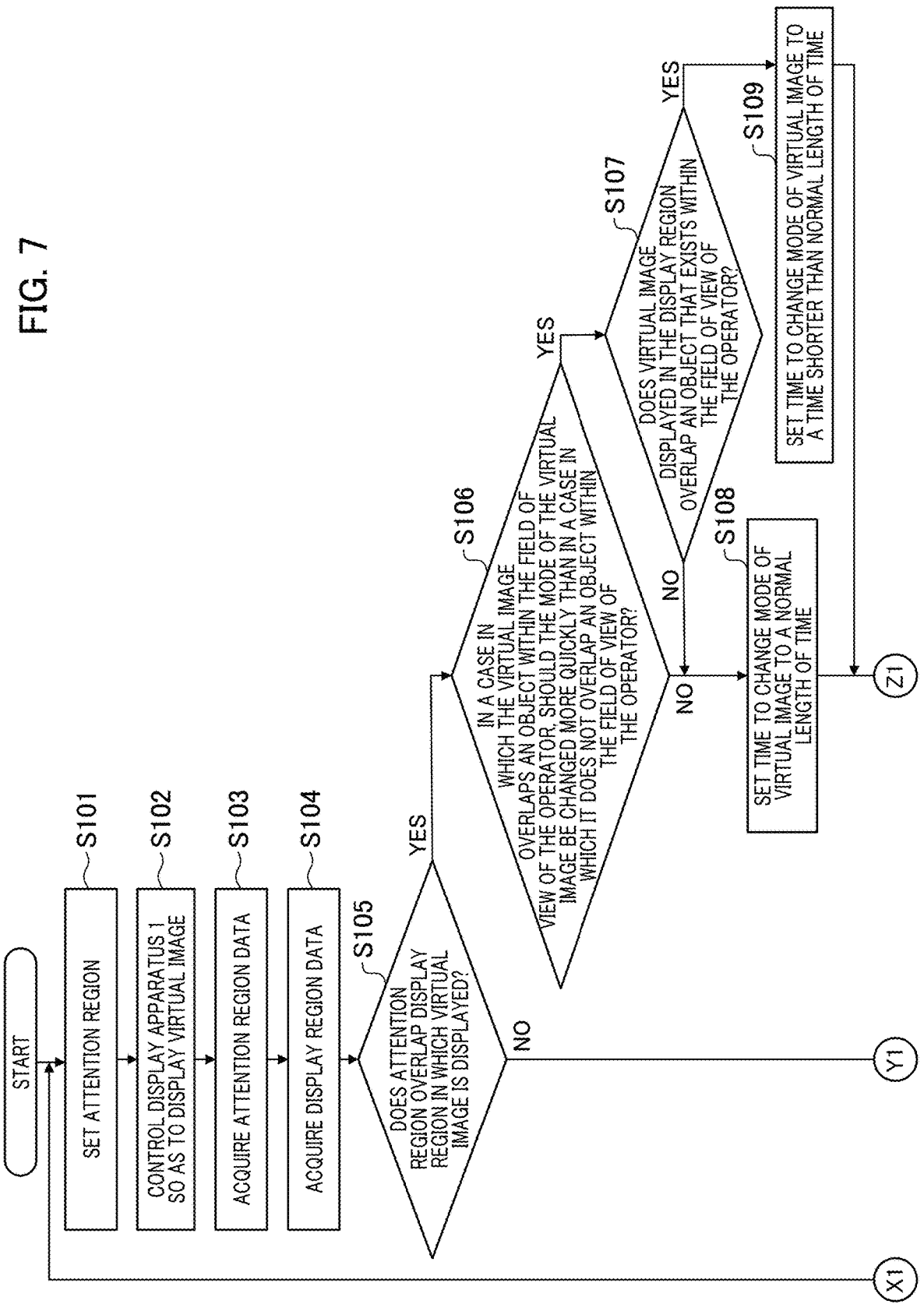

START

SET ATTENTION REGION — S101

CONTROL DISPLAY APPARATUS 1 SO AS TO DISPLAY VIRTUAL IMAGE — S102

ACQUIRE ATTENTION REGION DATA — S103

ACQUIRE DISPLAY REGION DATA — S104

DOES ATTENTION REGION OVERLAP DISPLAY REGION IN WHICH VIRTUAL IMAGE IS DISPLAYED? — S105

NO → X1

YES

IN A CASE IN WHICH THE VIRTUAL IMAGE OVERLAPS AN OBJECT WITHIN THE FIELD OF VIEW OF THE OPERATOR, SHOULD THE MODE OF THE VIRTUAL IMAGE BE CHANGED MORE QUICKLY THAN IN A CASE IN WHICH IT DOES NOT OVERLAP AN OBJECT WITHIN THE FIELD OF VIEW OF THE OPERATOR? — S106

NO → Y1

YES

DOES VIRTUAL IMAGE DISPLAYED IN THE DISPLAY REGION OVERLAP AN OBJECT THAT EXISTS WITHIN THE FIELD OF VIEW OF THE OPERATOR? — S107

NO

SET TIME TO CHANGE MODE OF VIRTUAL IMAGE TO A NORMAL LENGTH OF TIME — S108 → Z1

YES

SET TIME TO CHANGE MODE OF VIRTUAL IMAGE TO A TIME SHORTER THAN NORMAL LENGTH OF TIME — S109

CONTROL APPARATUS, CONTROL METHOD, STORAGE MEDIUM, AND MOVABLE APPARATUS, WITH SETTING TRANSMITTANCE IN ACCORDANCE WITH DISPLAY REGION OF VIRTUAL IMAGE

BACKGROUND OF THE INVENTION

Field of the Invention

The present invention relates to a control apparatus, a control method, a storage medium, and a movable apparatus.

Description of the Related Art

A Head-Up Display (HUD) is known for displaying a projected image (virtual image) that indicates information necessary for driving or the like within the field of view of the operator of an automobile by projecting the image onto the windshield or the like of the automobile by using a display apparatus mounted on the automobile.

In addition, the head-up display may include a function to decrease the size of a virtual image that indicates matters related to a position distant from the automobile, and to increase the size of the virtual image indicating matters related to a position close to the automobile, so as to cause the operator to perceive a sense of distance, a sense of depth, and the like of the virtual image.

Japanese Patent Application Laid-Open No. 2020-033003 discloses that, in a case in which a display control apparatus identifies a specific object that is overlapped by an information display image, the visibility of the shielding range of the information display image, which is displayed as a virtual image and overlaps the specific object, is reduced.

However, the display control apparatus that is disclosed in Japanese Patent Application Laid-Open No. 2020-033003 may make it difficult to recognize the entire information processing image because the visibility of the shielding range of the information processing image is reduced.

SUMMARY OF THE INVENTION

To solve the above-described problem, the present invention provides a control apparatus that is mounted on a movable apparatus and configured to control a display apparatus which displays a virtual image to an operator of the movable apparatus, the control apparatus comprising at least one processor or circuit configured to function as a display control unit configured to control the display apparatus so as to display content that is recorded in a recording unit, and a setting unit configured to set a display mode of the content, wherein the setting unit is configured to set transmittance such that, in a case in which the display region of the virtual image is equal to or greater than a predetermined area, the transmittance of the virtual image becomes larger than in a case in which the display region of the virtual image is less than the predetermined area.

Further features of the present invention will become apparent from the following description of exemplary embodiments with reference to the attached drawings.

BRIEF DESCRIPTION OF THE DRAWINGS

FIG. 7 is a flowchart showing an example of the process performed by the control apparatus according to the First Embodiment.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

Figure 1:
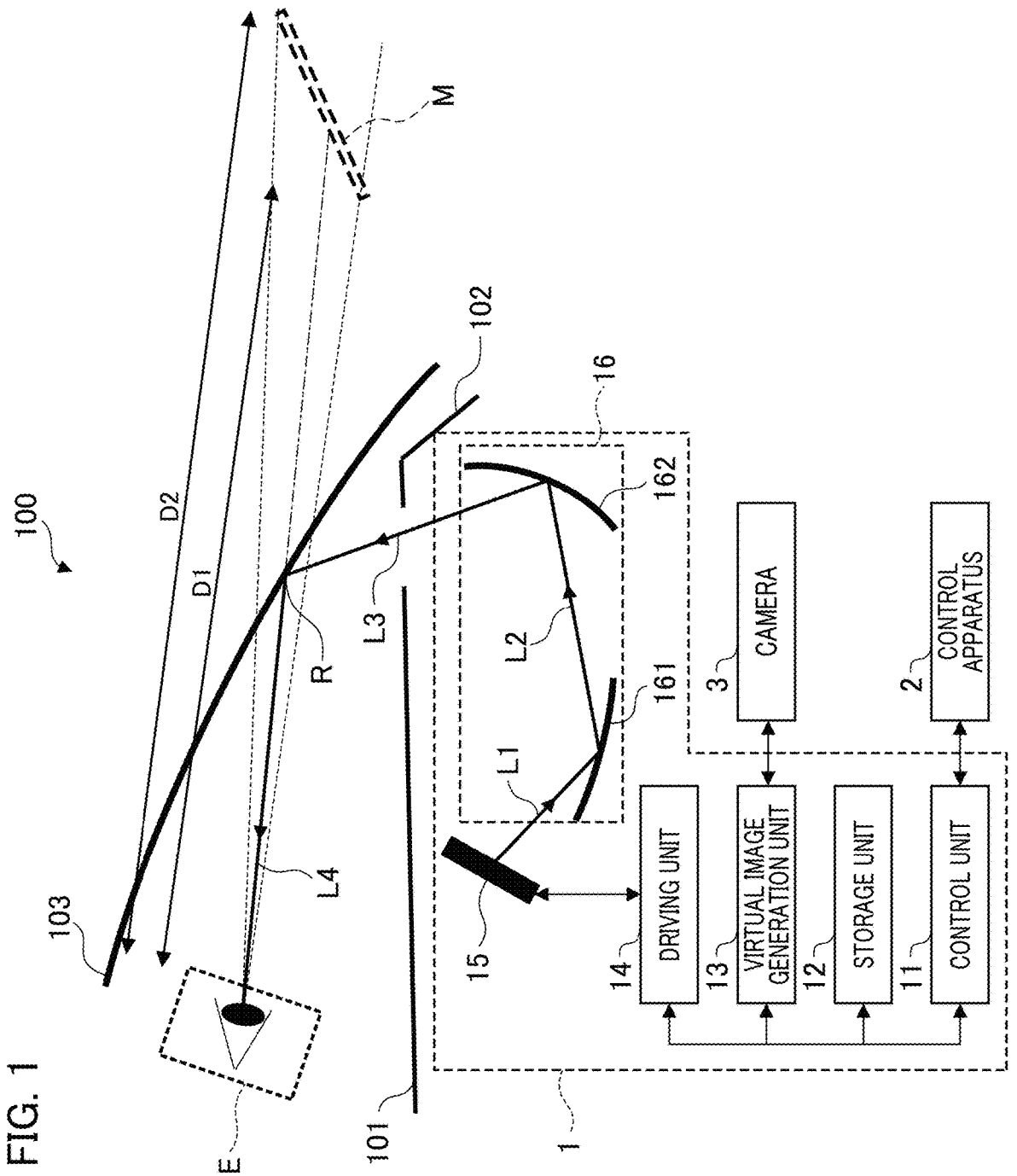
FIG. 1 is a diagram showing an example of a display apparatus, a control apparatus, and a camera according to a First Embodiment.

FIG. 1 is a diagram showing an example of a display apparatus, a control apparatus, and a camera according to the First Embodiment. FIG. 1 shows a display apparatus 1, a control apparatus 2, a camera 3, and a vehicle 100. It should be noted that the vehicle 100 is an automobile, which is a type of movable apparatus. In addition, in FIG. 1, only a dashboard 101, a hood 102, and a windshield 103 of the vehicle 100 are shown.

A display apparatus 1 is a head-up display, and is mounted inside the dashboard 101, as shown in FIG. 1. The display apparatus 1 includes a control unit 11, a storage unit 12, a virtual image generation unit 13, a driving unit 14, a display device 15, and an optical system 16.

The control unit 11 is, for example, a Central Processing Unit (CPU) and controls all the elements that configure the display apparatus 1. A storage unit 12 is a data rewritable memory and is preferably a non-volatile memory.

The storage unit 12 stores, for example, data that indicates each image that configures the image displayed on the display device 15, and data that indicates the position of the elements that configure the optical system 16. The virtual image generation unit 13 acquires, for example, data indicating the speed of the vehicle 100, data indicating the route that the vehicle 100 should travel, and the like from a main system (not shown).

In addition, the virtual image generation unit 13 generates image data (hereinafter simply referred to as an "image") that is displayed on the display device 15 based on the above-described data. It should be noted that the control unit 11 may be an Electronic Control Unit (ECU).

The driving unit 14 controls the display control unit 15 so as to display an image that was generated by the virtual image generation unit 13. Specifically, the driving unit 14 acquires data indicating the speed of the vehicle 100, and data indicating the scheduled route of the vehicle 100 from a main system (not shown), and transmits the data as a display instruction signal to the display device 15.

The display device 15 is, for example, a liquid crystal display and includes a backlight, a liquid crystal panel, and a lens. The backlight is a light source in which a light-emitting diode or the like is used, and emits light to the back side of the liquid crystal panel.

The liquid crystal panel changes the state of polarization of the light emitted from the backlight by using the optical properties of the liquid crystal, thereby either transmitting or blocking the light. The lens is disposed between the backlight and the liquid crystal panel and uniformly illuminates the liquid crystal panel with light that has been output from the backlight.

In accordance with the display instruction signal transmitted from the driving unit 14, the display device 15 displays the image generated by the virtual image generation unit 13 on the liquid crystal panel and lights the backlight. Thus, the display device 15 projects the virtual image in the direction of optical axis L1. This virtual image is an example of content recorded in a recording unit mounted on the control apparatus 2 or the like.

The optical system 16 includes, for example, a mirror 161 and a concave mirror 162. The mirror 161 is disposed so as to reflect the image projected from the direction of an optical axis L1 in the direction of an optical axis L2. The concave mirror 162 is disposed so as to reflect the image projected from the direction of the optical axis L2 in the direction of an optical axis L3 and project the image onto the windshield 103.

In addition, the concave mirror 162 serves to enlarge or reduce the image projected from the direction of the optical axis L2 or to correct the distortion of the image.

This image is reflected in the direction of an optical axis L4 at a reflection point R at which the optical axis L3 intersects with the windshield 103. In other words, this image is reflected toward the eye box E of the operator of the vehicle 100 at the reflection point R.

Thus, the image displayed on the display device 15 is formed as a virtual image on the pupil of the operator, and is visible to the operator in a display region M distant from the eye box E. In addition, as shown in FIG. 1, the distance from the eye box E to the virtual image is adjusted, for example, between a distance D1 and a distance D2.

Furthermore, as shown in FIG. 1, for example, the display apparatus 1 can impart a sense of depth to the virtual image by tilting the virtual image with respect to the optical axis L4.

The control apparatus 2 is implemented, for example, by a CPU and a program, and controls the display apparatus 1 so as to control the mode of the virtual image. The camera 3 generates an image of the region in which the virtual image can be displayed by the display apparatus 1 by capturing images of the region.

This image is used by the vehicle 100, the control apparatus 2, and the like for the purpose of recognizing an object that exists in the region, for the purpose of recognizing the position of the object, and for the purpose of determining the degree of attention that should be paid to the object while the vehicle 100 is moving. It should be noted that details of the control apparatus 2 will be described below.

Next, an example of the process performed by the control apparatus 2 according to the First Embodiment will be explained with reference to FIGS. 2 to 6.

Figure 2:
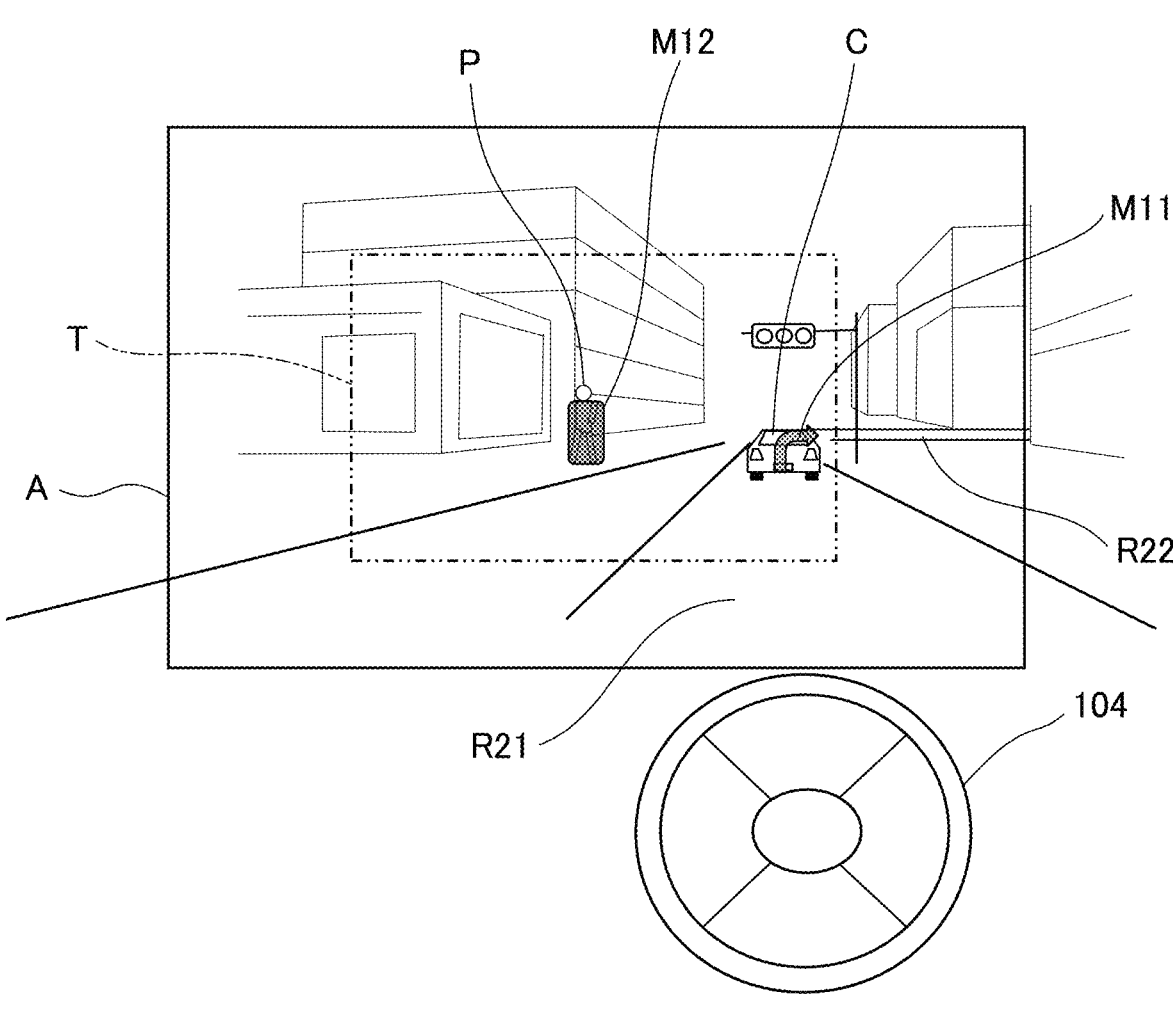
FIG. 2 is a diagram showing an example of an attention region and virtual images according to the First Embodiment.

FIG. 2 is a diagram showing an example of an attention region and virtual images according to the First Embodiment. The attention region is a region that the operator of the vehicle 100 should pay attention to within the field of view of the operator, and corresponds to the central region T in FIG. 2. FIG. 2 shows the view of the operator of the vehicle 100.

Specifically, FIG. 2 shows a steering wheel 104, a road R21, a road R22, a vehicle C different from the vehicle 100, a virtual image M11, a pedestrian P, a virtual image M12, a total region A, and a central region T, and the like.

The steering wheel 104 is used to operate the steering mechanism of the vehicle 100. The road R21 is the road on which the vehicle 100 is traveling. The road R22 intersects with the road R21 and is the road that the vehicle 100 enters from the road R21.

The vehicle C is a vehicle traveling in front of the vehicle 100. The virtual image M11 is an arrow that is turned 90 degrees to the right when viewed from the viewpoint of the operator of the vehicle 100, and emphasizes the route that the vehicle 100 should travel. It should be noted that the virtual image M11 may have a thickness in the front-rear direction when viewed from the perspective of the operator of the vehicle 100.

The pedestrian P is a person walking in front of the vehicle 100. The virtual image M12 is a geometric shape having a rectangular shape with rounded corners when viewed from the perspective of the operator of the vehicle 100, and emphasizes the pedestrian P. It should be noted that the virtual image M12 may have a thickness in the front-rear direction when viewed from the perspective of the operator of the vehicle 100.

The total region A shows the entirety of a two-dimensional or three-dimensional region in which the virtual image can be displayed by the display apparatus 1. The central region T is a region that includes the center of the field of view of the operator of the vehicle 100, and captures the road R21, the vehicle C, and the pedestrian P.

Figure 3A:
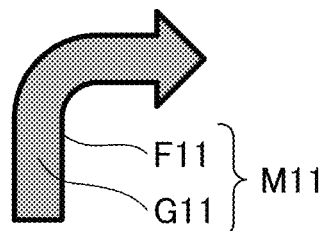
FIGS. 3A and 3B are diagrams showing a detailed example of the virtual images shown in FIG. 2.

FIG. 3 is a diagram showing a detailed example of the virtual images shown in FIG. 2. The virtual image M11 shown in FIG. 3A is an arrow displayed so as to make the operator recognize the route that vehicle 100 is about to travel. Specifically, the virtual image M11 is displayed so as to make the operator recognize that the vehicle 100 is to make a right turn at the next intersection.

In addition, the virtual image M11 is displayed so as to overlap the road on the right side that the vehicle 100 will travel on after making a right turn, in a case in which the distance between the vehicle 100 and the intersection at which the vehicle 100 is to make a right turn has become less than a certain distance. The operator of the vehicle 100 is able to visually recognize the virtual image M11 without significantly shifting the line of sight from the forward direction during driving.

As shown in FIG. 3A, the virtual image M11 shown in FIG. 2 includes an outline F11 and a region G11 enclosed by the outline F11. In addition, both the outline F11 and the region G11 have a certain level of transmittance, as shown in FIG. 3A.

Thus, the virtual image M11 allows the operator of the vehicle 100 to see through the virtual image M11 and visually recognize the vehicle C shown in FIG. 2. Furthermore, the transmittance of the outline F11 is lower than that of the region G11.

Figure 3B:
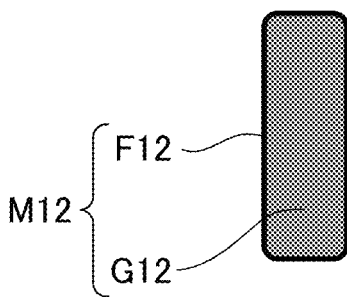

The virtual image M12 shown in FIG. 3B is a shape displayed for the purpose of emphasizing the pedestrian P that exists in the vicinity of the vehicle 100 and prompting the operator to pay attention to a pedestrian P. In the present embodiment, the virtual image M12 is displayed by being superimposed on the pedestrian P.

The virtual image M12 is displayed, for example, in a case in which the distance between the pedestrian P that exists in the vicinity of the vehicle 100 and the vehicle 100 has become less than a certain distance. By such display processing, the operator of the vehicle 100 is able to visually recognize the virtual image M12 without significantly shifting the line of sight from the forward direction during driving.

As shown in FIG. 3B, the virtual image M12 that was shown in FIG. 2 includes an outline F12 and a region G12 enclosed by the outline F12. In addition, both the outline F12 and the region G12 have a certain level of transmittance, as shown in FIG. 3B.

Thus, the virtual image M12 allows the operator of the vehicle 100 to see through the virtual image M12 and visually recognize the pedestrian P shown in FIG. 3. Furthermore, the transmittance of the outline F12 is lower than that of the region G12.

Figure 4:
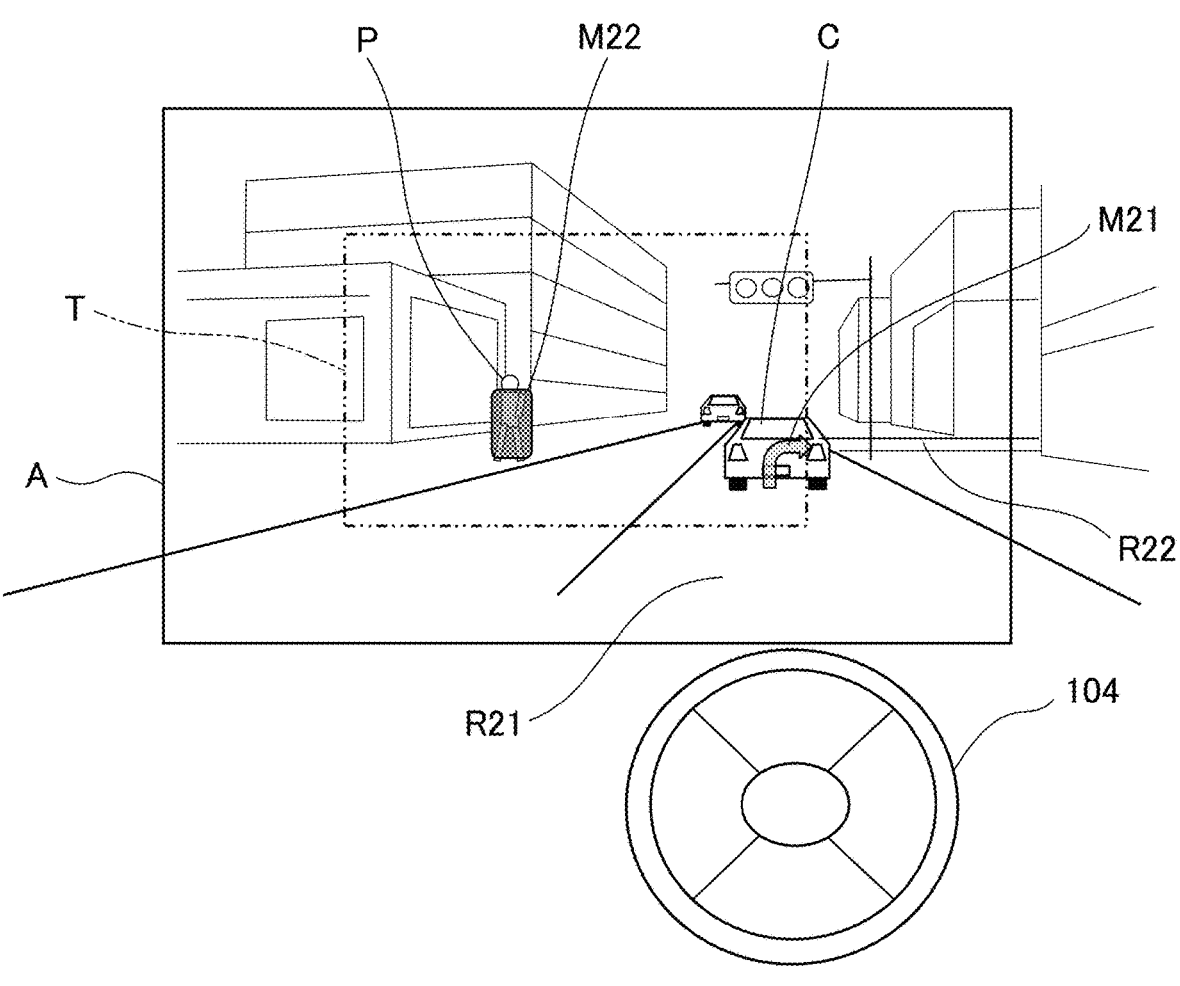
FIG. 4 is a diagram showing an example of an attention region and virtual images according to the First Embodiment.

FIG. 4 is a diagram showing an example of an attention region and virtual images according to the First Embodiment. FIG. 4 shows the field of view of the operator of the vehicle 100 at a point in time in which the vehicle 100 has advanced further forward than the point in time shown in FIG. 2.

FIG. 4 shows the steering wheel 104, the road R21, the road R22, the vehicle C, the pedestrian P, the total region A, and the central region T shown in FIG. 2, as well as a virtual image M21 and a virtual image M22.

Similar to the virtual image M11 shown in FIG. 2 and FIG. 3A, the virtual image M21 is an arrow that is turned 90 degrees to the right when viewed from the viewpoint of the operator of the vehicle 100, and emphasizes the route that the vehicle 100 should travel.

Because FIG. 4 shows a point in time at which the vehicle 100 has advanced further forward than the point in time shown in FIG. 2 and is approaching the intersection at which the vehicle 100 is to make a right turn, the display range of the virtual image M21 is larger than the display range of the virtual image M11. In addition, similar to the virtual image M11, the virtual image M21 includes an outline and a region enclosed by the outline, and the virtual image M21 may have a thickness in the front-rear direction when viewed from the perspective of the operator of the vehicle 100.

However, because the distance between the intersection of road R21 and road R22 and the vehicle 100 is shorter than in the case shown in FIG. 2, each part of virtual image M21 has larger dimensions than each corresponding part of the virtual image M11. In addition, the transmittance of the outline of the virtual image M21 is higher than the outline F11 shown in FIG. 3A, and the transmittance of the region enclosed by the outline is higher than the region G11 shown in FIG. 3A.

Furthermore, the transmittance of the outline of the virtual image M21 is lower than the transmittance of the region of the virtual image M21 that is enclosed by the outline.

Similar to the virtual image M12 shown in FIG. 2 and FIG. 3B, the virtual image M22 is a geometric shape having a rectangular shape with rounded corners when viewed from the perspective of the operator of the vehicle 100, and emphasizes the pedestrian P. Because FIG. 4 shows the field of view of the operator of the vehicle 100 at a point in time at which the vehicle 100 has advanced further forward than the point in time shown in FIG. 2, the virtual image M22 is larger than the virtual image M12.

In addition, similar to the virtual image M12, the virtual image M22 includes an outline and a region enclosed by the outline, and the virtual image M22 may have a thickness in the front-rear direction when viewed from the perspective of the operator of the vehicle 100.

However, because the distance between the pedestrian P and the vehicle 100 is shorter than in the case shown in FIG. 2, each part of the virtual image M22 has larger dimensions than each corresponding part of the virtual image M12. In addition, the transmittance of the outline of the virtual image M22 is higher than the outline F12 shown in FIG. 3B, and the transmittance of the region enclosed by the outline is higher than the region G12 shown in FIG. 3B. Furthermore, the transmittance of the outline of the virtual image M22 is lower than the transmittance of the region of the virtual image M22 that is enclosed by the outline.

Figure 5:
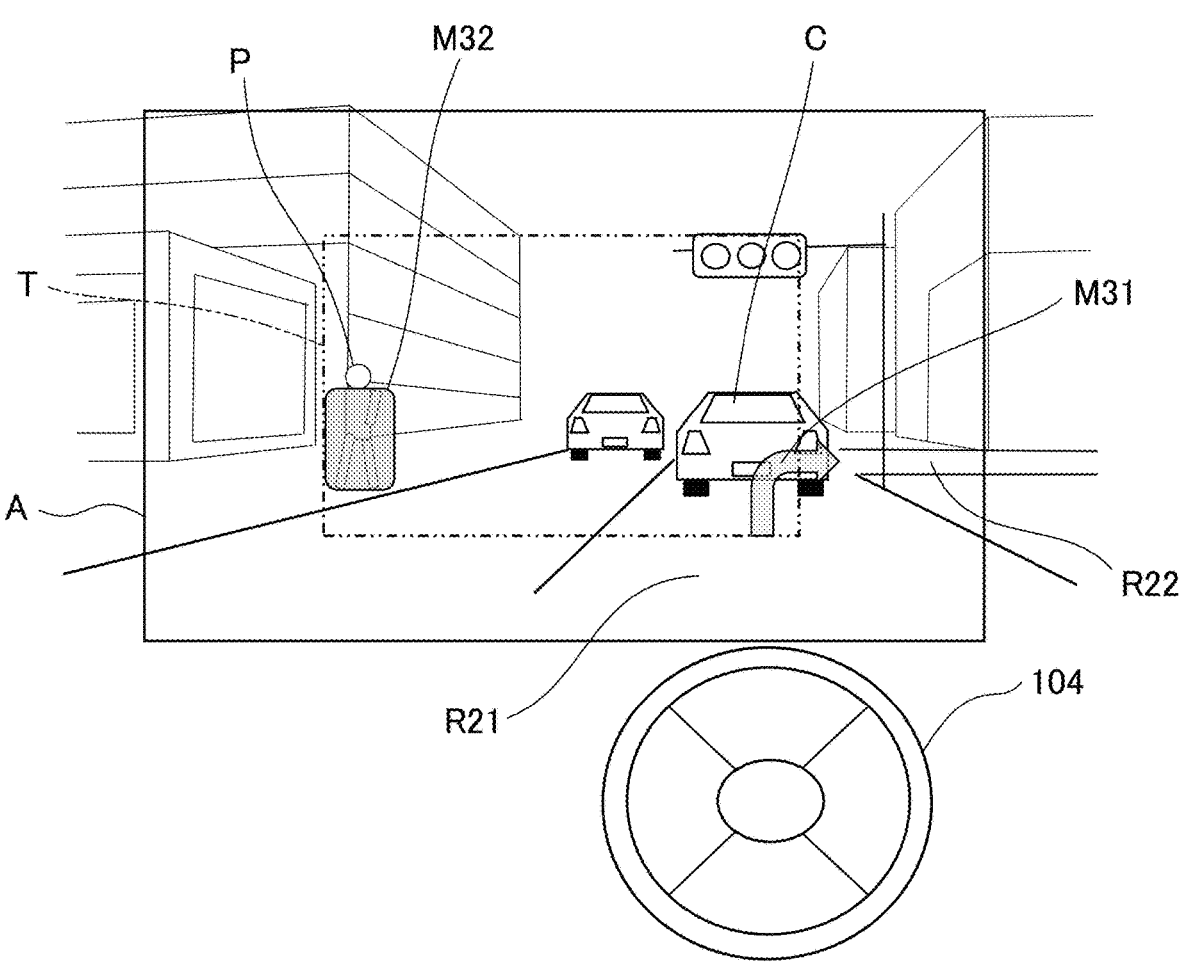
FIG. 5 is a diagram showing an example of an attention region and virtual images according to the First Embodiment.

FIG. 5 is a diagram showing an example of an attention region and virtual images according to the First Embodiment. FIG. 5 shows the field of view of the operator of the vehicle 100 at a point in time in which the vehicle 100 has advanced even further forward than the point in time shown in FIG. 4. FIG. 5 shows the steering wheel 104, the road R21, the road R22, the vehicle C, the pedestrian P, the total region A, and the central region T, as well as a virtual image M31 and a virtual image M32.

Similar to the virtual image M11 shown in FIG. 2 and FIG. 3A, and the virtual image M12 shown in FIG. 4, the virtual image M31 is an arrow that is turned 90 degrees to the right when viewed from the perspective of the operator of the vehicle 100, and emphasizes the route that the vehicle 100 should travel. Because FIG. 5 shows the field of view of the operator of the vehicle 100 at a point in time at which the vehicle 100 has advanced further forward than the point in time shown in FIG. 4, the display range of the virtual image M31 is larger than that of the virtual image M21.

In addition, similar to the virtual image M11 and the virtual image M12, the virtual image M31 includes an outline and a region enclosed by the outline, and may have a thickness in the front-rear direction when viewed from the perspective of the operator of the vehicle 100.

However, because the distance between the intersection of road R21 and road R22 and the vehicle 100 is shorter than in the cases shown in FIG. 2 and FIG. 4, each part of the virtual image M31 has larger dimensions than each corresponding part of the virtual images M11 and M21.

In addition, the transmittance of the outline of the virtual image M31 is higher than the transmittance of the outline of the virtual image M21, and the transmittance of the region enclosed by the outline is higher than the transmittance of the region enclosed by the outline of the virtual image M21. Furthermore, the transmittance of the outline of the virtual image M31 is lower than the transmittance of the region of the virtual image M31 that is enclosed by the outline.

Similar to the virtual image M12 shown in FIG. 2 and FIG. 3B, and the virtual image M22 shown in FIG. 4, the virtual image M32 is a geometric shape having a rectangular shape with rounded corners when viewed from the perspective of the operator of the vehicle 100, and emphasizes the pedestrian P.

Because FIG. 5 shows the field of view of the operator of the vehicle 100 at a point in time at which the vehicle 100 has advanced further forward than the point in time shown in FIG. 4, the display range of the virtual image M32 has become larger than that of the virtual image M22.

In addition, similar to the virtual image M12 and the virtual image M22, the virtual image M32 includes an outline and a region enclosed by the outline, and may have a thickness in the front-rear direction when viewed from the perspective of the operator of the vehicle 100.

However, because the distance between the pedestrian P and the vehicle 100 is shorter than in the cases shown in FIG. 2 and FIG. 4, each part of the virtual image M32 has larger dimensions than each corresponding part of the virtual image M12 and the virtual image M22.

In addition, the transmittance of the outline of the virtual image M32 is higher than the transmittance of the outline of the virtual image M22, and the transmittance of the region enclosed by the outline is higher than the transmittance of the region enclosed by the outline of the virtual image M22. Furthermore, the transmittance of the outline of the virtual image M32 is lower than the transmittance of the region of the virtual image M32 that is enclosed by the outline.

Figure 6:
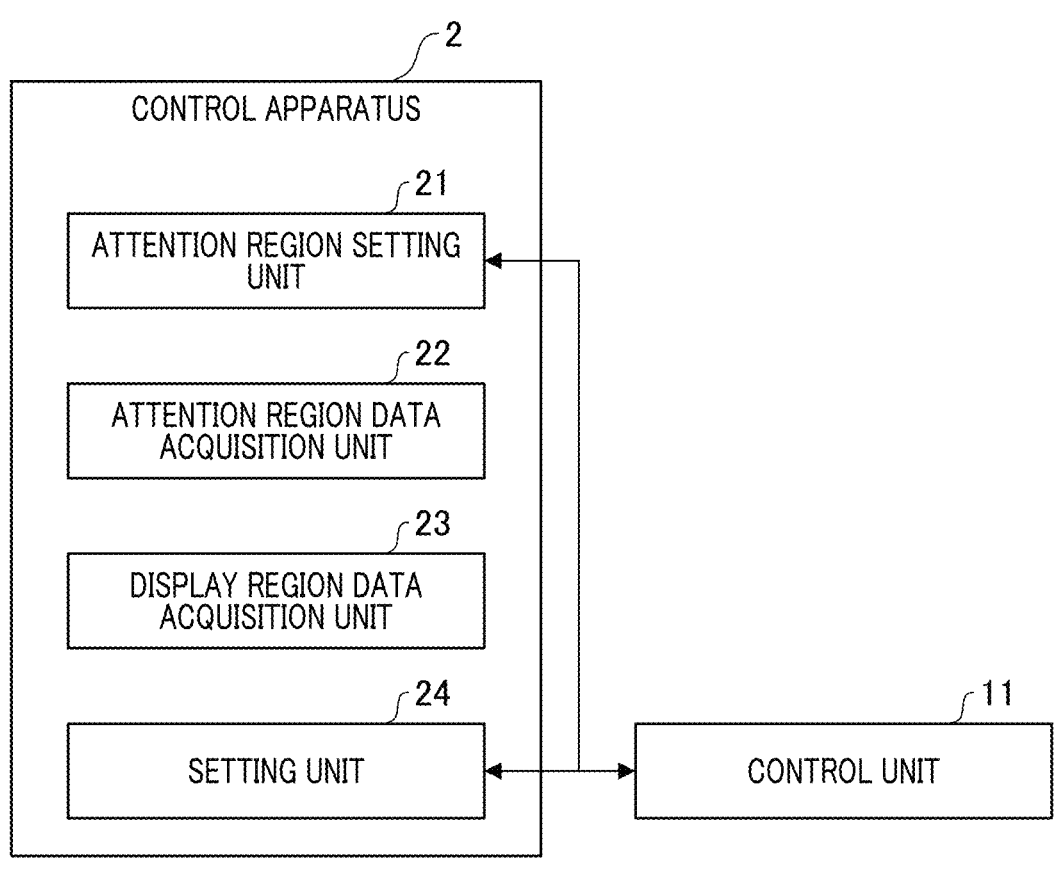
FIG. 6 is a diagram showing an example of the software configuration of the display apparatus according to the First Embodiment.

FIG. 6 is a diagram showing an example of the software configuration of the display apparatus according to the First Embodiment. As shown in FIG. 6, the control unit 2 includes an attention region setting unit 21, an attention region data acquisition unit 22, a display region data acquisition unit 23, and a setting unit 24.

The attention region setting unit 21 sets an attention region within the field of view of the operator of the vehicle 100 that the operator should pay attention to. The attention region is, for example, a two-dimensional or three-dimensional region forward of the vehicle 100, and is a region in which pedestrians, vehicles, and the like that the operator should pay attention to while driving the vehicle 100 may exist.

For example, the attention region is the central region T shown in FIG. 2, FIG. 4, and FIG. 5. Thus, in the First Embodiment, the attention region setting unit 21 sets a region that includes the position corresponding to the center of the field of view of the operator of the vehicle 100 as the attention region. Furthermore, the attention region setting unit 21 generates attention region data that indicates the range of the attention region.

The attention region data acquisition unit 22 acquires attention region data that indicates the range of the attention region. The attention region data acquisition unit 22 acquires the attention region data, for example, from the attention region setting unit 21 or from a storage medium and the like in which the attention region data is stored.

The display region data acquisition unit 23 acquires display region data that indicates the range of the display region in which the virtual image M11 is displayed by the display apparatus 1 mounted on the vehicle 100. This display region data shows the coordinates of a point that represents the position of the virtual image M11 in three-dimensional space, the coordinates of at least one point positioned on the outline of the virtual image M11, and the like.

Similarly, the display region data acquisition unit 23 acquires display region data that indicates the range of the display region in which the virtual image M12 is displayed by the display apparatus 1 mounted on the vehicle 100. This display region data shows the coordinates of a point that represents the position of the virtual image M12 in three-dimensional space, the coordinates of at least one point positioned on the outline of the virtual image M12, and the like.

The setting unit 24 controls the display apparatus 1, thereby controlling the mode of the virtual image displayed by the display apparatus 1.

For example, the setting unit 24 controls the display apparatus 1 so as to increase the size of the virtual image as the distance between the object indicated by the virtual image and the movable apparatus becomes shorter. Furthermore, the setting unit 24 controls the display apparatus 1 so as to decrease the size of the virtual image as the distance between the object indicated by the virtual image and the movable apparatus becomes longer.

Specifically, as shown in FIG. 2, FIG. 4, and FIG. 5, the setting unit 24 controls the display apparatus 1 so as to increase the size of the virtual image M11, the virtual image M21, and the virtual image M31 as the distance between the intersection of road R21 and road R22 and the vehicle 100 becomes shorter.

In addition, the setting unit 24 controls the display apparatus 1 so as to increase the size of the virtual image M12, the virtual image M22, and the virtual image M32 as the distance between the pedestrian P and the vehicle 100 becomes shorter.

The setting unit 24 controls the display apparatus 1 so as to control the mode of the virtual image according to both the area (size of the region) in the field of view of the operator that corresponds to the portion of the display region that overlaps the attention region, and the area (size of the region) of the attention region in the field of view of the operator. Here, the term "mode of the virtual image" includes, for example, the transmittance of at least a part of the virtual image.

Specifically, the setting unit 24 executes processing according to the ratio between the area (Sa) in the field of view of the operator at the portion of the display region that overlaps the central region T, and the area (Sb) in the field of view of the operator corresponding to the central region T.

For example, the setting unit 24 controls the display apparatus 1 so as to set the transmittance of the virtual image to be equal to or greater than a predetermined transmittance as the ratio (Sa/Sb) between Sa and Sb increases. In this case, as shown in FIG. 2, FIG. 4, and FIG. 5, the setting unit 24 controls the display apparatus 1 so that the transmittance becomes larger (becomes more transparent) in the order of the virtual image M11, the virtual image M21, and the virtual image M31.

In addition, similarly, as shown in FIG. 2, FIG. 4, and FIG. 5 the setting unit 24 controls the display apparatus 1 such the transmittance becomes larger in the order of the virtual image M12, the virtual image M22, and the virtual image M32.

To perform the control described above, for example, the setting unit 24 sets a first ratio as a predetermined ratio Sa and a second ratio as a predetermined ratio Sb. The first ratio is, for example, 0.1 (=Sa/Sb). The second ratio is, for example, 0.05 (=Sa/Sb). Thus, the setting unit 24 sets the predetermined ratio in a stepwise manner.

In this case, the setting unit 24 sets three levels of transmittance for the virtual image based on a case in which the ratio between Sa and Sb is equal to or less than the first ratio, a case in which the ratio between Sa and Sb exceeds the first ratio and is less than the second ratio, and a case in which the ratio between Sa and Sb is equal to or greater than the second ratio. Thus, in a case in which a plurality of transmittance levels of the virtual image is set, a ratio as a threshold of a number smaller by 1 than the total number of the set transmittance levels is set.

That is, the setting unit 24 uses at least one of the first ratio and second ratio and controls the virtual image display apparatus 1 so as to change the transmittance of each of the virtual image M12, the virtual image M22, and the virtual image M32 in a stepwise manner according to the above described two areas.

In other words, the setting unit 24 performs control so as to increase the transmittance of the virtual image as the area of the virtual image becomes larger. In contrast, the setting unit 24 performs control so as to decrease the transmittance of the virtual image as the area of the virtual image becomes smaller.

Then, in a case in which a portion that overlaps the attention region exists within the display region, the setting unit 24 ensures instant visibility of the virtual image and the object emphasized by the virtual image without causing any annoyance to the operator of the vehicle 100 due to the rapid change in transmittance. This can also be said to be applicable to the scene shown in FIG. 2, the scene shown in FIG. 4, and the scene shown in FIG. 5.

In addition, the setting unit 24 controls the display apparatus 1 such that the transmittance of the outline of the virtual image becomes lower than the transmittance of the inner region inside the outline of the virtual image. For example, the setting unit 24 controls the display apparatus 1 so that the transmittance of the outline F11 of the virtual image M11 becomes lower than the transmittance of the inner region G11 inside the outline F11. Furthermore, for example, the setting unit 24 controls the display apparatus 1 so that the transmittance of the outline F12 of the virtual image M12 becomes lower than the transmittance of the region G12 of the inside of the outline F12.

It should be noted that the setting unit 24 may control the display apparatus 1 such that the transmittance of the outline of the virtual image becomes lower than the transmittance of the inner region inside the outline of the virtual image in a case in which the ratio of the size of the display region to the size of the attention region is equal to or greater than a predetermined ratio. In addition, the above-described control is also performed for the virtual image M12, the virtual image M21, the virtual image M22, the virtual image M31, and the virtual image M32.

In addition, in a case in which the predetermined ratio described above is less than a predetermined threshold, the setting unit 24 may control the display apparatus 1 so that the transmittance of the outline F11 of the virtual image M11 becomes the same as the transmittance of the inner region G11 inside the outline F11.

Furthermore, in this case, the setting unit 24 performs the aforementioned processing while always maintaining a state in which the transmittance of the inner region G11 is higher than that of the transmittance of the outline F11. It should be noted that the above-described control is also performed for the virtual image M12, the virtual image M21, the virtual image M22, the virtual image M31, and the virtual image M32.

It should be noted that in a case in which the display region overlaps an object that exists within the field of view of the operator, the setting unit 24 may control the display apparatus 1 so as to change the display mode of the virtual image more quickly than in a case in which the display region does not overlap an object that exists within the field of view of the operator.

In other words, in a case in which the display region overlaps an object existing within the field of view of the operator, the time for changing the display mode of the virtual image is shorter compared to a case in which the display region does not overlap any object that exists within the field of view of the operator.

For example, in a case in which the display region overlaps an object that exists within the field of view of the operator, the display mode of the virtual image is immediately changed to the target display mode. In addition, in a case in which the display region does not overlap an object that exists within the field of view of the operator, the display mode of the virtual image is changed in a stepwise manner to the target display mode.

In addition, even in a case in which the display region overlaps an object that exists within the field of view of the operator, the setting unit 24 may set a virtual image for which the time for changing the display mode is shortened, and a virtual image for which the time for changing the display mode is not shortened, according on the type of content of the virtual image that is displayed.

For example, content that represents route information, as shown in FIG. 3A, is categorized into a type that shortens the time for changing the display mode. Furthermore, content representing individuals or objects, such as pedestrians, as shown in FIG. 3B, is classified into a category in which shortening the time for changing the display mode is not performed, due to the intended use thereof for superimposition on the target individuals or objects.

Figure 8:
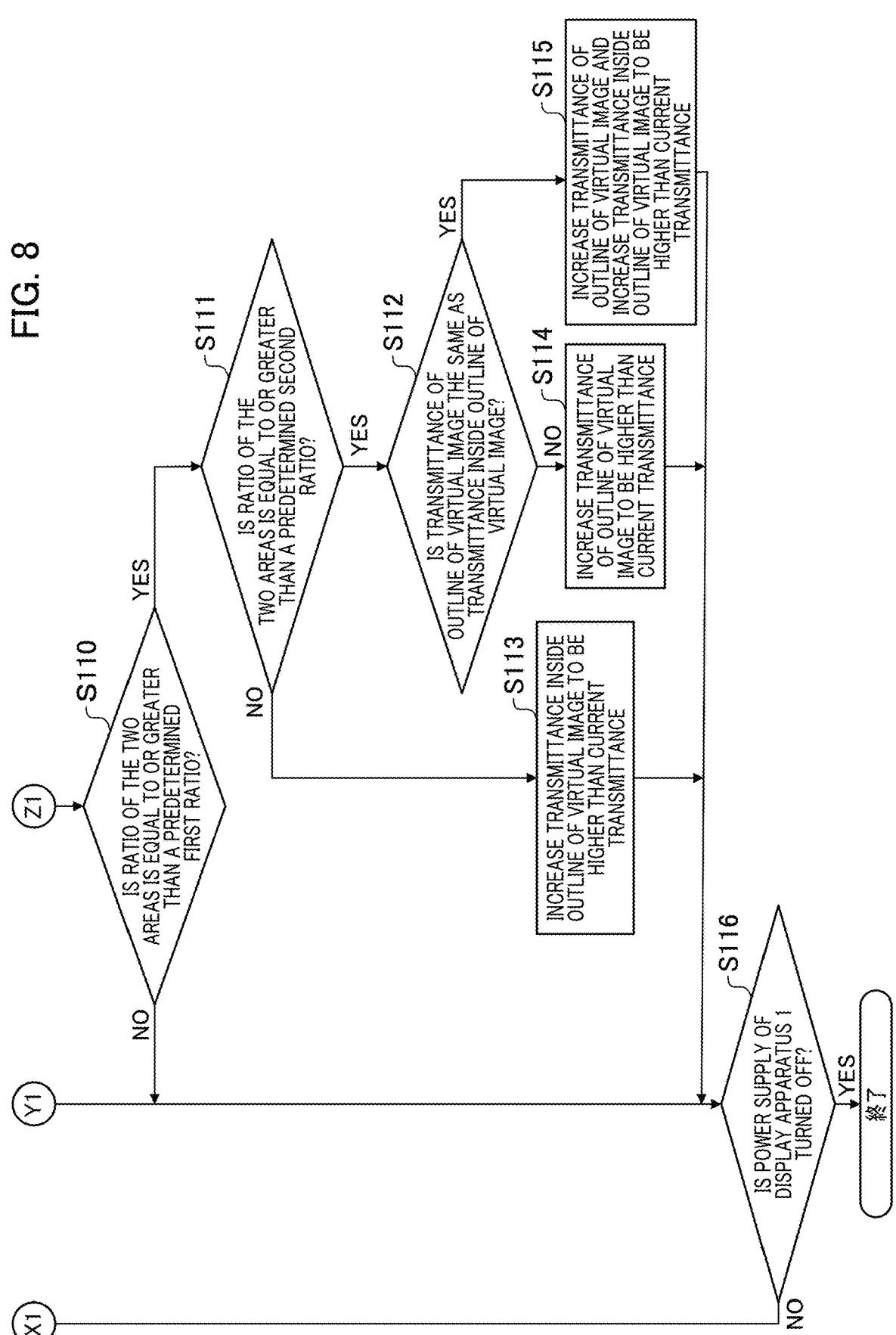
FIG. 8 is a flowchart showing an example of the process performed by the control apparatus according to the First Embodiment.

Next, referring to FIG. 7 and FIG. 8, an example of processing performed by the control apparatus 2 according to the First Embodiment will be explained. FIG. 7 and FIG. 8 are flowcharts showing examples of processing executed by the control apparatus according to the First Embodiment. Furthermore, the flowchart shown in FIG. 7 is connected to the flowchart shown in FIG. 8 by a connector X1, a connector Y1, and a connector Z1.

In step S101, the attention region setting unit 21 sets the attention region.

In step S102, the setting unit 24 controls the display apparatus 1 so as to display the virtual image.

In step S103, the attention region data acquisition unit 22 acquires attention region data.

In step S104, the display region data acquisition unit 23 acquires display region data.

In step S105, the setting unit 24 determines whether or not the attention region that was set in step S101 overlaps the display region in which the virtual image is displayed in step S102 within the field of view of the operator of the movable apparatus.

In a case in which the setting unit 24 determines that the attention region set in step S101 overlaps the display region in which the virtual image is displayed in step S102 within the field of view of the operator of the movable apparatus (step S105: YES), the processing proceeds to step S106.

In contrast, in a case in which the setting unit 24 determines that the attention region set in step S101 does not overlap the display region in which the virtual image is displayed in step S102 within the field of view of the operator of the movable apparatus (step S105: NO), the processing proceeds to step S116.

In step S106, in a case in which the display region in which the virtual image is displayed in step S102 overlaps an object that exists within the field of view of the operator, the setting unit 24 determines whether or not the virtual image is a virtual image for which the mode of the virtual image should be changed more quickly than in a case in which the virtual image does not overlap an object within the field of view of the operator.

In a case in which the setting unit 24 determines that the virtual image is a virtual image for which the mode of the virtual image should be changed more quickly in a case in which the virtual image overlaps an object within the field of view of the operator than in a case in which the virtual image does not overlap an object within the field of view of the operator (step S106: YES), the processing proceeds to step S107.

For example, content that represents route information, as shown in FIG. 3A, is determined to be a virtual image for which the mode of the virtual image should be changed more quickly in a case in which the virtual image overlaps an object within the field of view of the operator than in a case in which the virtual image does not overlap an object within the field of view of the operator.

In contrast, in a case in which the setting unit 24 determines that the virtual image is not a virtual image for which the mode of the virtual image should be changed more quickly in a case in which the virtual image overlaps an object within the field of view of the operator than in a case in which the virtual image does not overlap an object within the field of view of the operator (step S106: NO), the processing proceeds to step S108.

For example, content that represents an individual or an object, such as a pedestrian, as shown in FIG. 3B, is determined not to be a virtual image for which the mode of the virtual image should be changed more quickly in a case in which the virtual image overlaps an object within the field of view of the operator than in a case in which the virtual image does not overlap an object within the field of view of the operator.

In this manner, based on the processing in step S106, the setting unit 24 decides whether or not to shorten the time to change the mode of the virtual image displayed in the display region in step S102, in a case in which the display region overlaps an object that exists within the field of view of the operator, as opposed to a case in which the display region does not overlap an object within the field of view of the operator.

In step S107, the setting unit 24 determines whether or not the virtual image displayed in the display region of step S102 overlaps an object that exists within the field of view of the operator. In a case in which the setting unit 24 determines that the virtual image displayed in the display region of step S102 overlaps an object that exists within the field of view of the operator (step S107: YES), the processing proceeds to step S109.

In contrast, in a case in which the setting unit 24 determines that the virtual image displayed in the display region of step S102 does not overlap an object that exists within the field of view of the operator (step S107: NO), the processing proceeds to step S108.

In step S108, the setting unit 24 sets the time to change the mode of the virtual image displayed in step S102 to a normal length of time. This normal length of time is the time taken to change the mode of the virtual image displayed in the display region of step S102 in a case in which the display region does not overlap an object that exists within the field of view of the operator.

In step S109, the setting unit 24 sets the time to change the mode of the virtual image displayed in step S102 to a time shorter than the normal length of time.

In step S110, the setting unit 24 determines whether or not the ratio of the two areas is equal to or greater than a predetermined first ratio. The first area is the area of the portion of the display region, in which the virtual image displayed in step S102 is shown, that overlaps the attention region that was set in step S101, and is an area in the field of view of the operator. The second area is the area of the attention region in the field of view of the operator.

In a case in which the setting unit 24 determines that the ratio of the two areas is equal to or greater than the predetermined first ratio (step S110: YES), the processing proceeds to step S111. In contrast, in a case in which the setting unit 24 determines that the ratio of the two areas is less than the predetermined first ratio (step S110: NO), the processing proceeds to step S116.

In step S111, the setting unit 24 determines whether or not the ratio of the two areas is equal to or greater than a predetermined second ratio. The two areas referred to here are the same two areas described in the explanation of step S110.

In a case in which the setting unit 24 determines that the ratio of the two areas is equal to or greater than the predetermined second ratio (step S111: YES), the processing proceeds to step S112. In contrast, in a case in which the setting unit 24 determines that the ratio of the two areas is less than the predetermined second ratio (step S111: NO), the processing proceeds to step S113.

In step S112, the setting unit 24 determines whether or not the transmittance of the outline of the virtual image displayed in step S102 is the same as the transmittance inside the outline of the virtual image.

In step S113, the setting unit 24 increases the transmittance inside the outline of the virtual image displayed in step S102 to be higher than the current transmittance.

In step S114, the setting unit 24 increases the transmittance of the outline of the virtual image displayed in step S102 to be higher than the current transmittance.

In step S115, the setting unit 24 increases the transmittance of the outline of the virtual image displayed in step S102 and increase the transmittance inside the outline of the virtual image to be higher than the current transmittance.

In step S116, the setting unit 24 determines whether or not the power supply of the display apparatus 1 is turned off. In a case in which it is determined that the power supply of the display apparatus 1 is turned off (step S116: YES), the setting unit 24 terminates the process. In contrast, in a case in which it is determined that the power supply of the display apparatus 1 has not been turned off (step S116: NO), the setting section 24 returns the process to step S101.

Above, the processing executed by the control apparatus 2 according to the First Embodiment was explained. The control apparatus 2 is configured so as to set the transmittance such that, in a case in which the display region of the virtual image is equal to or greater than a predetermined area, the transmittance of the virtual image becomes larger than in a case in which the display region of the virtual image is less than the predetermined area.

Thus, in a case in which the display region of the virtual image is equal to or greater than a predetermined area, the control apparatus 2 increases the transmittance of the virtual image, enabling the operator of the vehicle 100 to easily visually recognize both the virtual image and any object that is overlapped by the virtual image within the field of view of the operator.

Furthermore, the control apparatus 2 controls the display apparatus 1 so as to control the display mode of the virtual image according to the region in the field of view of the operator corresponding to the portion of the display region that overlaps the attention region, and according to the region in the field of view corresponding to the attention region.

In addition, the control apparatus 2 sets a central region T, which includes the center of the field of view of the operator of the vehicle 100, as the attention region. Thus, the control apparatus 2 enables the operator of the vehicle 100 to easily visually recognize both the virtual image and the object, even when there is a significant overlap between the virtual image and the object within the critical field of view of the operator.

In addition, the control apparatus 2 controls the display apparatus 1 such that the transmittance of the outline of the virtual image becomes lower than the transmittance inside the outline of the virtual image. Thereby, the control apparatus 2 clarifies the outline of the virtual image, and enables the operator of the vehicle 100 to easily visually recognize the virtual image.

In addition, this allows the control apparatus 2 to increase the transmittance inside the outline of the virtual image to a certain extent, thereby enabling the operator of the vehicle 100 to easily visually recognize any object that is overlapped by the virtual image.

In addition, the control apparatus 2 controls the display apparatus 1 so as to increase the size of the virtual image as the distance between the object indicated by the virtual image and the vehicle 100 becomes shorter, and so as to decrease the size of the virtual image as the distance between the object indicated by the virtual image and vehicle 100 becomes longer.

Thereby, the control apparatus 2 displays larger virtual images for objects that are shorter in distance from the vehicle 100, thus enabling the operator of the vehicle 100 to easily recognize a sense of distance to the object.

In addition, the control apparatus 2 controls the display apparatus such that, in a case in which the display region within the field of view of the operator of the vehicle 100 overlaps an object that exists within the field of view of the operator of the vehicle 100, the mode of the virtual image is changed more quickly than in a case in which the display region within the field of view of the operator of the vehicle 100 does not overlap an object that exists within the field of view of the operator of the vehicle 100.

Thereby, in a case in which the virtual image overlaps an object within the field of view of the operator of the vehicle 100, the control apparatus 2 can more quickly increase the transmittance of the virtual image, thus enabling the operator of the vehicle 100 to easily visually recognize the object that is overlapped by the virtual image.

Second Embodiment

According to the First Embodiment, the control apparatus 2 sets a central region that includes the center of the field of view of the operator of the movable apparatus as the attention region, and controls the mode of the virtual image based on the central region. In contrast, according to a Second Embodiment, the control apparatus 2 sets a region that is different from the central region as the attention region, and controls the mode of the virtual image based on the central region.

Specifically, in a case in which the speed of the vehicle 100 is equal to or greater than a predetermined first speed, the control apparatus 2 according to the Second Embodiment sets a first region that captures the distant view of the vehicle 100 as the attention region, and controls the mode of the virtual image based on the first region.

That is, in a case in which the vehicle 100 is traveling at high speed, the control apparatus 2 according to the Second Embodiment sets the distant view of the vehicle 100 as a significant range for the operator. In addition, in a case in which the speed of the vehicle 100 is less than a predetermined first speed, the control apparatus 2 according to the Second Embodiment sets a second region that captures a near view of the vehicle 100 as the attention region, and controls the mode of the virtual image based on the second region.

In summary, the control apparatus 2 according to the Second Embodiment sets a region that captures a significant region for the operator as an attention region according to the speed of the vehicle 100, and controls the mode of the virtual image based on the attention region.

Therefore, in the Second Embodiment, content that differs from the First Embodiment will be explained, and explanations of content that is the same as that of the First Embodiment are therefore omitted as appropriate. In addition, in the description of the Second Embodiment, the same constituent elements as those in the First Embodiment are designated by the same reference numerals as those in the First Embodiment.

Figure 9:
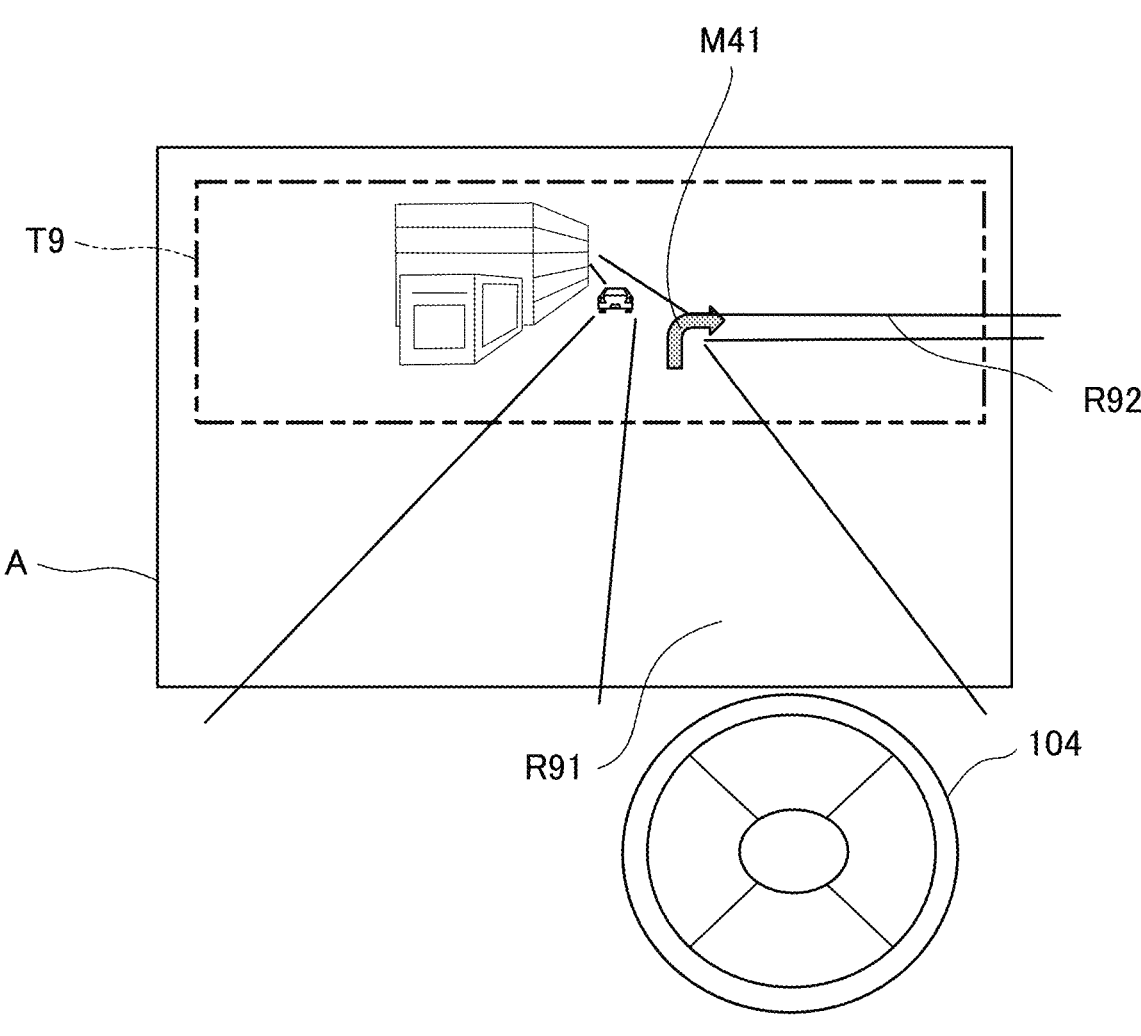
FIG. 9 is a diagram showing an example of an attention region and virtual image according to a Second Embodiment.

FIG. 9 is a diagram showing an example of an attention region and virtual image according to the Second Embodiment. FIG. 9 shows the field of view of the operator of the vehicle 100, wherein the vehicle 100 is traveling at a speed of 50 km/h, which is equal to or greater than a predetermined first speed of 40 km/h given as an example.

Specifically, FIG. 9 shows the steering wheel 104, a road R91, a road R92, a virtual image M41, the total region A, a first region T9, and the like.

The road R91 is the road on which the vehicle 100 is traveling. The road R92 intersects with the road R91 and is the road that the vehicle 100 enters from the road R91. The virtual image M41 is an arrow that is turned 90 degrees to the right when viewed from the viewpoint of the operator of the vehicle 100, and emphasizes the route that the vehicle 100 should travel.

It should be noted that the virtual image M41, which includes an outline and a region enclosed by the outline, may have a thickness in the front-rear direction when viewed from the perspective of the operator of the vehicle 100.

The total region A shows the entirety of a two-dimensional or three-dimensional region in which the virtual image can be displayed by the display apparatus 1. The first region T9 is a region that captures the portion within the field of view of the operator of the vehicle 100 in which the distance from the vehicle 100 is equal to or greater than a predetermined first distance. In FIG. 9, the first region T9 is a region that captures the road R91 and the road R92.

The attention region setting unit 21 sets an attention region within the field of view of the operator of the vehicle 100 that the operator should pay attention to. The attention region is, for example, a two-dimensional or three-dimensional region forward of the vehicle 100, and is a region in which pedestrians, vehicles, and the like that the operator should pay attention to while driving the vehicle 100 may exist.

Specifically, the attention region setting unit 21 determines whether or not the traveling speed of the vehicle 100 is equal to or greater than a predetermined speed, and if the traveling speed of the vehicle 100 is determined to be equal to or greater than the predetermined speed, sets the first region T9 as the attention region.

For example, in a case in which the speed of the vehicle 100 is 50 km/h and the predetermined first speed is 40 km/h, the attention region setting unit 21 sets the first region T9 as the attention region. The attention region setting unit 21 may set two or more speeds in a stepwise manner to be a threshold value, such as a predetermined first speed.

Therefore, based on the results of measuring the traveling speed of the vehicle 100, the attention region setting unit 21 can select an appropriate first region from among a plurality of first regions corresponding to the speed of the vehicle 100 and set the first region as the attention region.

The attention region data acquisition unit 22 acquires attention region data that indicates the range of the attention region. The display region data acquisition unit 23 acquires display region data that indicates the range of the display region in which the virtual image M41 is displayed by the display apparatus 1 mounted on the vehicle 100.

The setting unit 24 controls the display apparatus 1, thereby controlling the display mode of the virtual image displayed by the display apparatus 1. In the case shown in FIG. 9, the setting unit 24 also executes the processes explained in the First Embodiment as appropriate.

Figure 10:
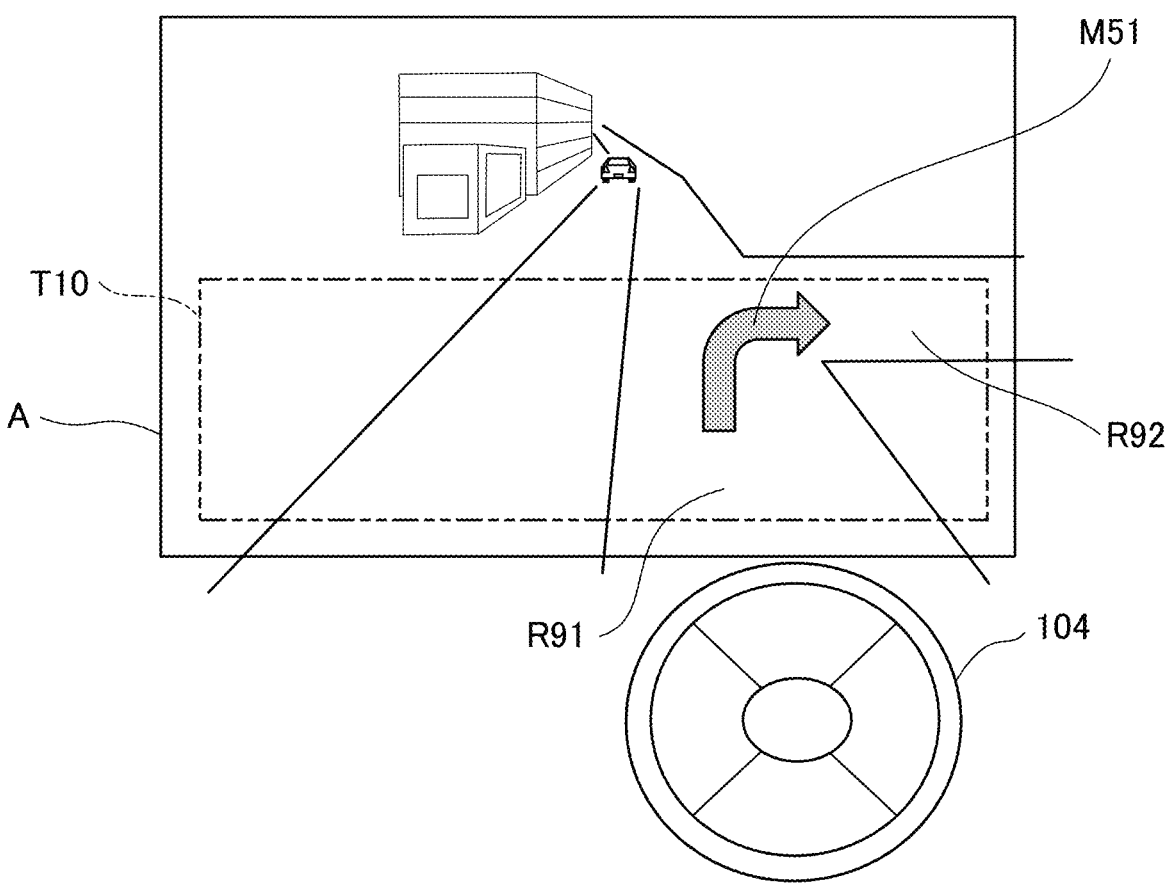
FIG. 10 is a diagram showing an example of an attention region and virtual image according to the Second Embodiment.

FIG. 10 is a diagram showing an example of an attention region and virtual image according to the Second Embodiment. FIG. 10 shows the field of view of the operator of the vehicle 100 at a point in time at which, subsequent to the point in time shown in FIG. 9, the vehicle 100 has advanced forward and is approaching the intersection of the road R91 and the road R92, while simultaneously decelerating.

In this case, the vehicle 100 is traveling at a speed of 30 km/h, which is below the predetermined first speed of 40 km/h given as an example. Specifically, FIG. 10 shows the steering wheel 104, the road R91, the road R92, a virtual image M51, the total region A, the second region T10, and the like.

The virtual image M51 is an arrow that is turned 90 degrees to the right when viewed from the viewpoint of the operator of the vehicle 100, and emphasizes the route that the vehicle 100 should travel. Because FIG. 10 shows a point in time at which the vehicle 100 has advanced further forward than the point in time shown in FIG. 9 and is approaching the intersection at which the vehicle 100 is to make a right turn, the virtual image M51 is larger than the virtual image M41.

It should be noted that, similar to the virtual image M41, the virtual image M51 includes an outline and a region enclosed by the outline, and the virtual image M51 may have a thickness in the front-rear direction when viewed from the perspective of the operator of the vehicle 100.

The total region A shows the entirety of a two-dimensional or three-dimensional region in which the virtual image can be displayed by the display apparatus 1. The second region T10 is a region that captures the portion within the field of view of the operator of the vehicle 100 in which the distance from the vehicle 100 is less than a predetermined second distance. The second region T10 is a region that captures the portion within the field of view of the operator of the vehicle 100 in which the distance from the vehicle 100 is less than a predetermined second distance. In FIG. 10, the second region T10 is a region that captures the road R91 and the road R92.

The attention region setting unit 21 sets an attention region within the field of view of the operator of the vehicle 100 that the operator should pay attention to. The attention region is, for example, a two-dimensional or three-dimensional region forward of the vehicle 100, and is a region in which pedestrians, vehicles, and the like that the operator should pay attention to while driving the vehicle 100 may exist.

Specifically, the attention region setting unit 21 determines whether or not the traveling speed of the vehicle 100 is less than a predetermined speed, and if the traveling speed of the vehicle 100 is determined to be less than the predetermined speed, the unit sets the second region T10 as the attention region.

For example, in a case in which the speed of the vehicle 100 is 30 km/h and the predetermined first speed is 40 km/h, the attention region setting unit 21 sets the second region T10 as the attention region. Therefore, based on the results of measuring the traveling speed of the vehicle 100, the attention region setting unit 21 can select an appropriate second region from among a plurality of second regions corresponding to the speed of the vehicle 100 and set the second region as the attention region.

The attention region data acquisition unit 22 acquires attention region data that indicates the range of the attention region. The display region data acquisition unit 23 acquires display region data that indicates the range of the display region in which the virtual image M51 is displayed by the display apparatus 1 mounted on the vehicle 100.

The setting unit 24 controls the display apparatus 1, thereby controlling the display mode of the virtual image displayed by the display apparatus 1. In the case shown in FIG. 10, the setting unit 24 also executes the processes explained in the First Embodiment as appropriate.

Figure 11:
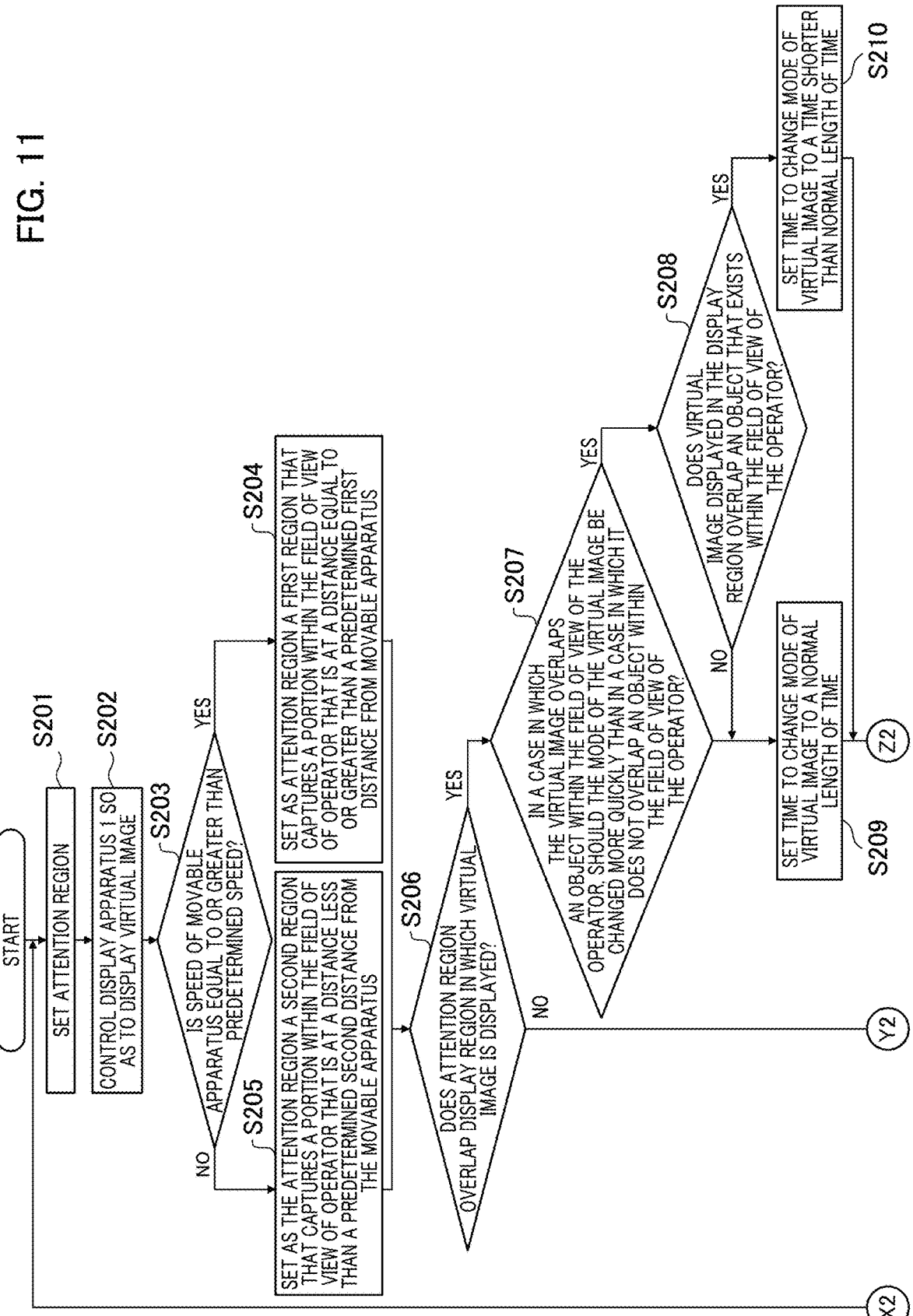
FIG. 11 is a flowchart showing an example of the process performed by the control apparatus according to the Second Embodiment.
Figure 12:
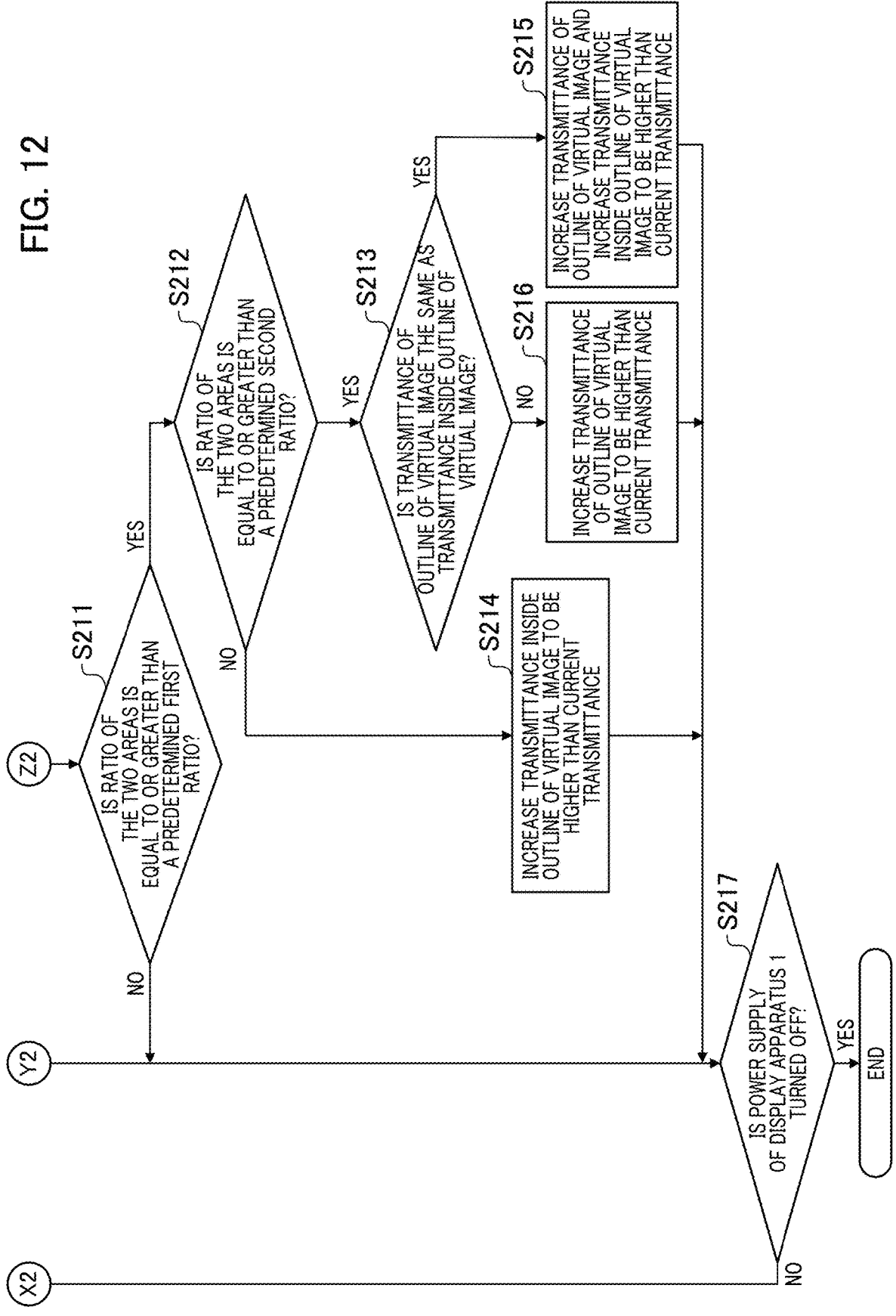
FIG. 12 is a flowchart showing an example of the process performed by the control apparatus according to the Second Embodiment.

Next, referring to FIG. 11 and FIG. 12, an example of processing performed by the control apparatus 2 according to the Second Embodiment will be explained. FIG. 11 and FIG. 12 are flowcharts showing examples of processing executed by the control apparatus according to the Second Embodiment. Furthermore, the flowchart shown in FIG. 11 is connected to the flowchart shown in FIG. 12 by a connector X2, a connector Y2, and a connector Z2.

In step S201, the attention region setting unit 21 sets the attention region.

In step S202, the setting unit 24 controls the display apparatus 1 so as to display the virtual image.

In step S203, the attention region setting unit 21 determines whether or not the speed of the movable apparatus is equal to or greater than a predetermined speed. In a case in which the attention region setting unit 21 determines that the speed of the movable apparatus is equal to or greater than the predetermined speed (step S203: YES), the processing proceeds to step S204.

In contrast, in a case in which the attention region setting unit 21 determines that the speed of the movable apparatus is less than the predetermined speed (step S203: NO), the processing proceeds to step S205.

In step S204, the attention region setting unit 21 sets as the attention region a first region that captures a portion within the field of view of the operator of the movable apparatus that is at a distance equal to or greater than a predetermined first distance from the movable apparatus.

In step S205, the attention region setting unit 21 sets as the attention region a second region that captures a portion within the field of view of the operator of the movable apparatus that is at a distance less than a predetermined second distance from the movable apparatus.

In step S206, the setting unit 24 determines whether or not the attention region that was set in step S204 or step S205 overlaps the display region in which the virtual image is displayed in step S202 within the field of view of the operator of the movable apparatus.

In a case in which the setting unit 24 determines that the attention region that was set in step S204 or step S205 overlaps the display region in which the virtual image is displayed in step S202 within the field of view of the operator of the movable apparatus (step S206: YES), the processing proceeds to step S207.

In contrast, in a case in which the setting unit 24 determines that the attention region that was set in step S204 or step S205 does not overlap the display region in which the virtual image is displayed in step S202 in the field of view of the operator of the movable apparatus (step S206: NO), the processing proceeds to step S217.

In step S207, in a case in which the display region in which the virtual image is displayed in step S202 overlaps an object that exists within the field of view of the operator, the setting unit 24 determines whether or not the virtual image is a virtual image for which the mode of the virtual image should be changed more quickly than in a case in which the virtual image does not overlap an object within the field of view of the operator.

In a case in which the setting unit 24 determines that the virtual image is a virtual image for which the mode of the virtual image should be changed more quickly in a case in which the virtual image overlaps an object within the field of view of the operator than in a case in which the virtual image does not overlap an object within the field of view of the operator (step S207: YES), the processing proceeds to step S208.

For example, content that represents route information, as shown in FIG. 3A, is determined to be a virtual image for which the mode of the virtual image should be changed more quickly in a case in which the virtual image overlaps an object within the field of view of the operator than in a case in which the virtual image does not overlap an object within the field of view of the operator.

In contrast, in a case in which the setting unit 24 determines that the virtual image is not a virtual image for which the mode of the virtual image should be changed more quickly in a case in which the virtual image overlaps an object within the field of view of the operator than in a case in which the virtual image does not overlap an object within the field of view of the operator (step S207: NO), the processing proceeds to step S209.

For example, content that represents an individual or an object, such as a pedestrian, as shown in FIG. 3B, is determined not to be a virtual image for which the mode of the virtual image should be changed more quickly in a case in which the virtual image overlaps an object within the field of view of the operator than in a case in which the virtual image does not overlap an object within the field of view of the operator.

In step S208, the setting unit 24 determines whether or not the virtual image displayed in the display region of step S202 overlaps an object that exists within the field of view of the operator. In a case in which the setting unit 24 determines that the virtual image displayed in the display region of step S202 overlaps an object that exists within the field of view of the operator (step S208: YES), the processing proceeds to step S210.

In contrast, in a case in which the setting unit 24 determines that the virtual image displayed in the display region of step S202 does not overlap an object that exists within the field of view of the operator (step S208: NO), the processing proceeds to step S209.

In step S209, the setting unit 24 sets the time to change the mode of the virtual image displayed in step S202 to a normal length of time. This normal length of time is the time taken to change the mode of the virtual image displayed in the display region of step S202 in a case in which the display region does not overlap an object that exists within the field of view of the operator.

In step S210, the setting unit 24 sets the time to change the mode of the virtual image displayed in step S202 to a time shorter than the normal length of time.

In step S211, the setting unit 24 determines whether or not the ratio of the two areas is equal to or greater than a predetermined first ratio. The first area is the area of the portion of the display region in which the virtual image displayed in step S202 is shown that overlaps the attention region set in either step S204 or step S205, and is an area in the field of view of the operator.

The second area is the area of the attention region in the field of view of the operator. In a case in which the setting unit 24 determines that the ratio of the two areas is equal to or greater than or equal to the predetermined first ratio (step S211: YES), the processing proceeds to step S212. In contrast, in a case in which the setting unit 24 determines that the ratio of the two areas is less than the predetermined first ratio (step S211: NO), the processing proceeds to step S217.

In step S212, the setting unit 24 determines whether or not the ratio of the two areas is equal to or greater than a predetermined second ratio. The two areas referred to here are the same two areas described in the explanation of step S211.

In a case in which the setting unit 24 determines that the ratio of the two areas is equal to or greater than the predetermined second ratio (step S212: YES), the processing proceeds to step S213. In contrast, in a case in which the setting unit 24 determines that the ratio of the two areas is less than the predetermined second ratio (step S212: NO), the processing proceeds to step S214.

In step S213, the setting unit 24 determines whether or not the transmittance of the outline of the virtual image displayed in step S202 is the same as the transmittance inside the outline of the virtual image.

In step S214, the setting unit 24 increases the transmittance inside the outline of the virtual image displayed in step S202 to be higher than the current transmittance.

In step S215, the setting unit 24 increases the transmittance of the outline of the virtual image displayed in step S202 and increase the transmittance inside the outline of the virtual image to be higher than the current transmittance.

In step S216, the setting unit 24 increases the transmittance of the outline of the virtual image displayed in step S102 to be higher than the current transmittance.

In step S217, the setting unit 24 determines whether or not the power supply of the display apparatus 1 is turned off. In a case in which it is determined that the power supply of the display apparatus 1 is turned off (step S217: YES), the setting unit 24 terminates the processing. In contrast, in a case in which it is determined that the power supply of the display apparatus 1 has not been turned off (step S217: NO), the setting section 24 returns the processing to step S201.

Furthermore, the control apparatus 2 controls the display apparatus 1 so as to control the display mode of the virtual image according to the region in the field of view of the operator corresponding to the portion of the display region that overlaps the attention region, and according to the region in the field of view corresponding to the attention region.

Specifically, in a case in which the speed of the vehicle 100 is equal to or greater than a predetermined speed, the control apparatus 2 sets a first region T9, which captures the portion within the field of view of the operator of the vehicle 100 in which the distance from the vehicle 100 is equal to or greater than a predetermined first distance, as the attention region.

Thus, in a case in which the speed of the vehicle 100 is high, and the portion of the field of view of the operator that is distant from the vehicle 100 is significant for driving, the control apparatus 2 enables the operator of the vehicle 100 to easily visually recognize both the virtual image and any object overlapped by the virtual image within the field of view of the operator.

Alternatively, in a case in which the speed of the vehicle 100 is less than a predetermined speed, the control apparatus 2 sets a second region T10, which captures the portion within the field of view of the operator in which the distance from the vehicle 100 is less than a predetermined second distance, as the attention region.

Thus, in a case in which the speed of the vehicle 100 is slow and the portion of the field of view of the operator that is close to vehicle 100 is significant for driving, the control apparatus 2 enables the operator of the vehicle 100 to easily visually recognize both the virtual image and any object overlapped by the virtual image within the field of view of the operator.

It should be noted that in the First Embodiment and the Second Embodiment, a case in which the movable apparatus is an automobile has been described by way of example, but a movable apparatus is not limited thereto. The above-described movable apparatus may be any vehicle in which a person rides and drives or maneuvers.

An example of such a vehicle includes, for example, a motorcycle, a forklift, or a construction machine provided with a windshield and a display apparatus capable of displaying content on the windshield. A construction machine is, for example, an excavator or a crane vehicle.

In addition, in the First Embodiment and the Second Embodiment, examples were provided in which the control apparatus 2 executes processing with respect to the forward direction of the vehicle 100, but the processing is not limited thereto. The control apparatus 2 may also execute the above-described processing with respect to the rearward direction of the vehicle 100, or with respect to the leftward direction or the rightward direction of the operator's seat of the vehicle 100.

In addition, in the above-described First Embodiment and Second Embodiment, examples were provided in which the control apparatus 2 controls the display apparatus 1 so as to change the transmittance at least a part of the virtual image as a mode of the virtual image, but examples are not limited thereto.

The control apparatus 2 may also control the display apparatus 1 so as to change at least one of the hue, the brightness, the color saturation, and at least one element that configures the virtual image as a mode of the virtual image. Here, an "element" refers to a shape that configures the virtual image.

Thereby, the control apparatus 2 can change at least one of the hue, the brightness, the color saturation, and the elements that configure the virtual image, thus enabling the operator of the vehicle 100 to easily visually recognize at least one of the virtual image and any object that the virtual image overlaps within the field of view.

In addition, in the First Embodiment and the Second Embodiment described above, a case in which the setting unit 24 controls the display apparatus 1 so to set the transmittance of the virtual image to be equal to or greater than a predetermined transmittance in a case in which the ratio of the area in the field of view of the operator at the portion that overlaps the central region T in the display region to the area in the field of view of the operator of the central region T is equal to or greater than a predetermined ratio was explained as an example, however an example is not limited thereto.

For example, the setting unit 24 may control the display apparatus 1 so as to set the transmittance of the virtual image to be equal to or greater than a predetermined transmittance in a case in which at least one dimension (size) of the virtual image is equal to or greater than a predetermined dimension. As a result, even in a case in which the virtual image is large and there is a possibility that an object overlapped by the virtual image becomes difficult to be visually recognized by the operator of the vehicle 100, the setting unit 24 can enable the operator of the vehicle 100 to easily visually recognize the object.

In addition, in this case, the setting unit 24 stepwise sets at least two levels with regard to predetermined dimensions. Thereby, it becomes possible for the setting unit 24 to set a preferred transmittance according to the dimensions of the virtual image, enabling the operator of the vehicle 100 to suitably visually recognize both the virtual image and any object overlapped by the virtual image.

In addition, in the embodiments described above, a case was explained as an example in which the display apparatus 1 displays an arrow for the purpose of making the operator recognize the route that vehicle 100 is about to travel, and displays a shape so as to emphasize a pedestrian that exists in the vicinity of the vehicle 100, with the purpose of prompting the operator to pay attention to the pedestrian.

However, the display apparatus 1 may display a virtual image for a purpose other than these purposes. For example, the display apparatus 1 may display a virtual image so as to make the operator recognize the speed of the vehicle 100, vehicles positioned in a forward direction, information of the periphery of the vehicle 100, or the condition of the vehicle 100. Alternatively, the display apparatus 1 may display a virtual image so as to make the operator recognize whether or not the vehicle 100 is deviating from the intended driving lane.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the control apparatus through a network or various storage media. Then, a computer (or a CPU, an MPU, or the like) of the control apparatus may be configured to read and execute the program. In such a case, the program and the storage medium storing the program configure the present invention.

Furthermore, the present invention includes, for example, at least one processor or circuit configured to perform the functions of the embodiments described above. It should be noted that a plurality of processors may be used to implement distributed processing.

This application claims the benefit of Japanese Patent Application No. 2023-010059, filed on Jan. 26, 2023, which is hereby incorporated by reference herein in its entirety.

What is claimed is:

1. A control apparatus that is mounted on a movable apparatus and that is configured to control a display apparatus which displays a virtual image to an operator of the movable apparatus, the control apparatus comprising:

at least one processor or circuit configured to function as:

(1) a display control unit configured to control the display apparatus so as to display content that is recorded in a recording unit;

(2) a setting unit configured to set a display mode of the content;

(3) an attention region setting unit configured to set an attention region within the field of view of the operator of the movable apparatus to which the operator of the movable apparatus should pay attention;

(4) an attention region data acquisition unit configured to acquire attention region data that indicates a range of the attention region; and (5) a display region data acquisition unit configured to acquire display region data that shows a range of a display region in which a virtual image is displayed by the display apparatus, wherein the setting unit is configured to set transmittance such that, in a case in which the display region of the virtual image is equal to or greater than a predetermined area, the transmittance of the virtual image becomes larger than in a case in which the display region of the virtual image is less than the predetermined area, wherein the setting unit is configured to control the display apparatus so as to control the display mode of the virtual image according to (1) a region in the field of view that corresponds to a portion of the display region that overlaps the attention region and (2) a region in the field of view that corresponds to the attention region, and wherein, in a case in which the speed of the movable apparatus is equal to or greater than a predetermined speed, the attention region setting unit is configured to set as the attention region a first region that captures a portion within the field of view of the operator of the movable apparatus at a distance equal to or greater than a predetermined first distance from the movable apparatus.

2. A control apparatus that is mounted on a movable apparatus and that is configured to control a display apparatus which displays a virtual image to an operator of the movable apparatus, the control apparatus comprising:

at least one processor or circuit configured to function as:

(1) a display control unit configured to control the display apparatus so as to display content that is recorded in a recording unit;

(2) a setting unit configured to set a display mode of the content;

(3) an attention region setting unit configured to set an attention region within the field of view of the operator of the movable apparatus to which the operator of the movable apparatus should pay attention;

(4) an attention region data acquisition unit configured to acquire attention region data that indicates a range of the attention region; and (5) a display region data acquisition unit configured to acquire display region data that shows a range of a display region in which a virtual image is displayed by the display apparatus, wherein the setting unit is configured to set transmittance such that, in a case in which the display region of the virtual image is equal to or greater than a predetermined area, the transmittance of the virtual image becomes larger than in a case in which the display region of the virtual image is less than the predetermined area, wherein the setting unit is configured to control the display apparatus so as to control the display mode of the virtual image according to (1) a region in the field of view that corresponds to a portion of the display region that overlaps the attention region and (2) a region in the field of view that corresponds to the attention region, and wherein, in a case in which the speed of the movable apparatus is less than a predetermined speed, the attention region setting unit is configured to set a second region that captures a portion within the field of view of the operator of the movable apparatus at a distance from the movable apparatus that is less than a predetermined second distance as the attention region.

3. A control apparatus that is mounted on a movable apparatus and that is configured to control a display apparatus which displays a virtual image to an operator of the movable apparatus, the control apparatus comprising:

at least one processor or circuit configured to function as:

(1) a display control unit configured to control the display apparatus so as to display content that is recorded in a recording unit;

(2) a setting unit configured to set a display mode of the content;

(3) an attention region setting unit configured to set an attention region within the field of view of the operator of the movable apparatus to which the operator of the movable apparatus should pay attention;

(4) an attention region data acquisition unit configured to acquire attention region data that indicates a range of the attention region; and (5) a display region data acquisition unit configured to acquire display region data that shows a range of a display region in which a virtual image is displayed by the display apparatus, wherein the setting unit is configured to set transmittance such that, in a case in which the display region of the virtual image is equal to or greater than a predetermined area, the transmittance of the virtual image becomes larger than in a case in which the display region of the virtual image is less than the predetermined area, wherein the setting unit is configured to control the display apparatus so as to control the display mode of the virtual image according to (1) a region in the field of view that corresponds to a portion of the display region that overlaps the attention region and (2) a region in the field of view that corresponds to the attention region, wherein the setting unit is configured to control the display apparatus so as to change at least the transmittance, the hue, the brightness, or the color saturation of at least a part of the virtual image, or to change at least one element that configures the virtual image, and wherein the setting unit is configured to control the display apparatus such that the transmittance of the outline of the virtual image becomes lower than the transmittance inside the outline of the virtual image.

4. The control apparatus according to claim 3, wherein the attention region setting unit is configured to set a central region that includes the center of the field of view of the operator of the movable apparatus as the attention region.

5. The control apparatus according to claim 3, wherein the setting unit is further configured to control the display apparatus so as to increase the size of the virtual image as the distance between the object that is indicated by the virtual image and the movable apparatus becomes shorter, and so as to decrease the size of the virtual image as the distance between the object that is indicated by the virtual image and the movable apparatus becomes longer.

6. The control apparatus according to claim 5, wherein the setting unit is configured to control the display apparatus so as to set the transmittance of the virtual image to be equal to or greater than a predetermined transmittance in a case in which the ratio of the area in the field of view, corresponding to the portion of the display region that overlaps the attention region to the area in the field of view corresponding to the attention region, is equal to or greater than a predetermined ratio, or in a case in which at least one dimension of the virtual image is equal to or greater than a predetermined dimension.

7. The control apparatus according to claim 6, wherein the setting unit stepwise sets at least two levels with regard to at least one of the predetermined dimension and the predetermined ratio.

8. The control apparatus according to claim 1, wherein the setting unit is configured to control the display apparatus such that, in a case in which the display region within the field of view of the operator of the movable apparatus overlaps an object that exists within the field of view of the operator of the movable apparatus, a mode of the virtual image is changed more quickly than in a case in which the display region within the field of view of the operator of the movable apparatus does not overlap an object that exists within the field of view of the operator of the movable apparatus.

9. A movable apparatus on which is mounted the control apparatus according to claim 3.

10. A control method for controlling a display apparatus configured to display a virtual image to an operator of a movable apparatus, the control method comprising:

display controlling that controls the display apparatus so as to display content recorded in a recording unit;

setting that sets a display mode of the content;

setting that sets an attention region within the field of view of the operator of the movable apparatus to which the operator of the movable apparatus should pay attention;

acquiring that acquires attention region data that indicates a range of the attention region; and acquiring that acquires display region data that shows a range of a display region in which a virtual image is displayed by the display apparatus, wherein in the setting the display mode, the transmittance is set such that, in a case in which the display region of the virtual image is equal to or greater than a predetermined area, the transmittance of the virtual image becomes larger than in a case in which the display region of the virtual image is less than the predetermined area, wherein in the setting the display mode, the display mode of the virtual image is controlled according to (1) a region in the field of view that corresponds to a portion of the display region that overlaps the attention region and (2) a region in the field of view that corresponds to the attention region, wherein in the setting the display mode, the display apparatus is controlled so as to change at least the transmittance, the hue, the brightness, or the color saturation of at least a part of the virtual image, or to change at least one element that configures the virtual image, and wherein in the setting the display mode, the display apparatus is controlled such that the transmittance of the outline of the virtual image becomes lower than the transmittance inside the outline of the virtual image.

11. A non-transitory computer-readable storage medium configured to store a computer program for a display apparatus that displays a virtual image to an operator of a movable apparatus to execute the control method according to claim 10.

* * * * *